(12) United States Patent
Moisy et al.

(10) Patent No.: US 9,187,876 B2
(45) Date of Patent: Nov. 17, 2015

(54) DETECTION SYSTEM, JOINT SYSTEM PROVIDED WITH SUCH A DETECTION SYSTEM AND AUTOMOTIVE VEHICLE EQUIPPED WITH SUCH A JOINT SYSTEM

(75) Inventors: Stéphane Moisy, Tours (FR); Vincent Sausset, Azay le Rideau (FR)

(73) Assignee: AKTIEBOLAGET SKF, Gothenburg (DE)

( * ) Notice: Subject to any disclaimer, the term of this patent is extended or adjusted under 35 U.S.C. 154(b) by 1077 days.

(21) Appl. No.: 13/263,165

(22) PCT Filed: Apr. 6, 2009

(86) PCT No.: PCT/IB2009/052780
§ 371 (c)(1),
(2), (4) Date: Oct. 6, 2011

(87) PCT Pub. No.: WO2010/116203
PCT Pub. Date: Oct. 14, 2010

(65) Prior Publication Data
US 2012/0027504 A1 Feb. 2, 2012

(51) Int. Cl.
G01B 21/22 (2006.01)
E02F 9/00 (2006.01)
E02F 9/26 (2006.01)
G01D 1/00 (2006.01)
G01D 15/00 (2006.01)

(52) U.S. Cl.
CPC . *E02F 9/006* (2013.01); *E02F 9/26* (2013.01); *G01B 21/22* (2013.01); *G01D 1/00* (2013.01); *G01D 15/00* (2013.01); *Y10T 403/28* (2015.01)

(58) Field of Classification Search
CPC ................................. G01B 21/22; G01B 13/06
USPC .......................................... 33/1 N, 1 PT, 503
See application file for complete search history.

(56) References Cited

U.S. PATENT DOCUMENTS 5,402,582 A * 4/1995 Raab ............................... 33/503
5,611,147 A * 3/1997 Raab ............................... 33/503
(Continued)

FOREIGN PATENT DOCUMENTS

| EP | 1930507 | 6/2008 |
|---|---|---|
| FR | 2904671 | 2/2008 |
| JP | 2001330022 | 11/2001 |

*Primary Examiner* — Yaritza Guadalupe-McCall
(74) *Attorney, Agent, or Firm* — Bryan Peckjian; SKF USA Inc. Patent Dept.

(57) ABSTRACT

This detection system (40) comprises a detection assembly (50) for detecting a rotation parameter of one of the two parts with respect to the other, electrical connecting means (150, 160) adapted to connect the detection assembly (50) to a control unit. The electrical connecting means comprise at least one electric cable (150) extending outside the detection assembly (50) and outside a pin, between the detection assembly and the control unit. The detection system (40) also comprises a bracket (200) adapted to connect the detection assembly (50) to the second part when the detection assembly is mounted within a housing of the pin (30). The electric cable has a first portion (154) which extends parallel to the central axis ($X_{90}$) of the pin when the detection assembly (50) is mounted on the pin. The detection system (40) also includes means (212) to arrange a second portion (156) of the electric cable (150) and/or a connector (160) provided at the end of this second portion along a first arm (202) of the bracket, on a first side (2022) of the arm oriented towards the detection assembly (50).

14 Claims, 9 Drawing Sheets

(56) References Cited

U.S. PATENT DOCUMENTS

| | | | |
|---|---|---|---|
| 6,253,458 B1 * | 7/2001 | Raab et al. | 33/503 |
| 6,519,860 B1 * | 2/2003 | Bieg et al. | 33/503 |
| 6,668,466 B1 * | 12/2003 | Bieg et al. | 33/503 |
| 6,935,036 B2 * | 8/2005 | Raab et al. | 33/503 |
| 6,952,882 B2 * | 10/2005 | Raab et al. | 33/503 |
| 6,957,496 B2 * | 10/2005 | Raab et al. | 33/503 |
| 6,973,734 B2 * | 12/2005 | Raab et al. | 33/503 |
| 7,073,271 B2 * | 7/2006 | Raab et al. | 33/503 |
| 7,743,524 B2 * | 6/2010 | Eaton et al. | 33/503 |
| 7,765,707 B2 * | 8/2010 | Tomelleri | 33/503 |
| RE42,082 E * | 2/2011 | Raab et al. | 33/503 |
| 7,975,397 B2 * | 7/2011 | Meyer et al. | 33/613 |
| 8,112,896 B2 * | 2/2012 | Ferrari et al. | 33/503 |
| 8,276,286 B2 * | 10/2012 | Bailey et al. | 33/503 |
| 8,607,467 B2 * | 12/2013 | Raab | 33/503 |
| 8,615,893 B2 * | 12/2013 | Atwell et al. | 33/503 |
| 2008/0289838 A1 * | 11/2008 | Niarfeix et al. | 172/748 |
| 2012/0027504 A1 * | 2/2012 | Moisy et al. | 403/42 |
| 2014/0157609 A1 * | 6/2014 | Sugamura et al. | 33/1 N |
| 2015/0153170 A1 * | 6/2015 | Gonzalez et al. | G01B 21/22 |

* cited by examiner

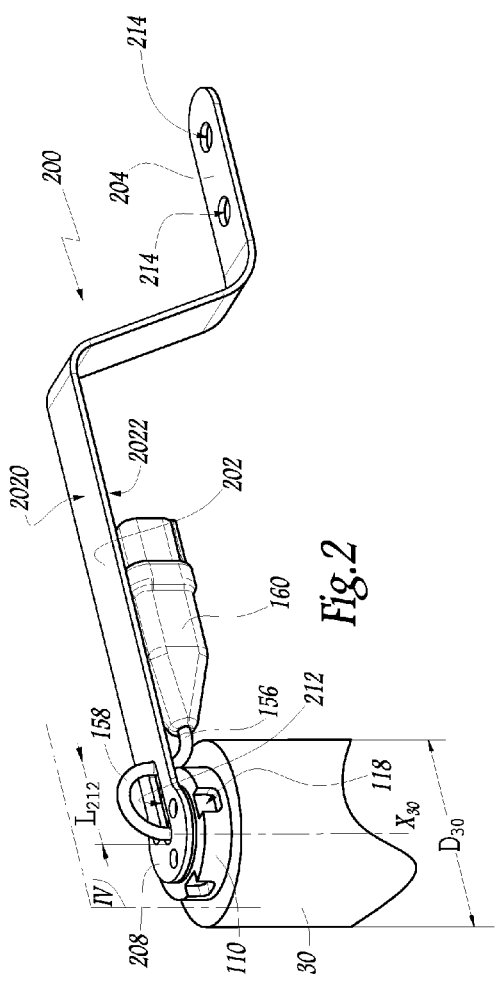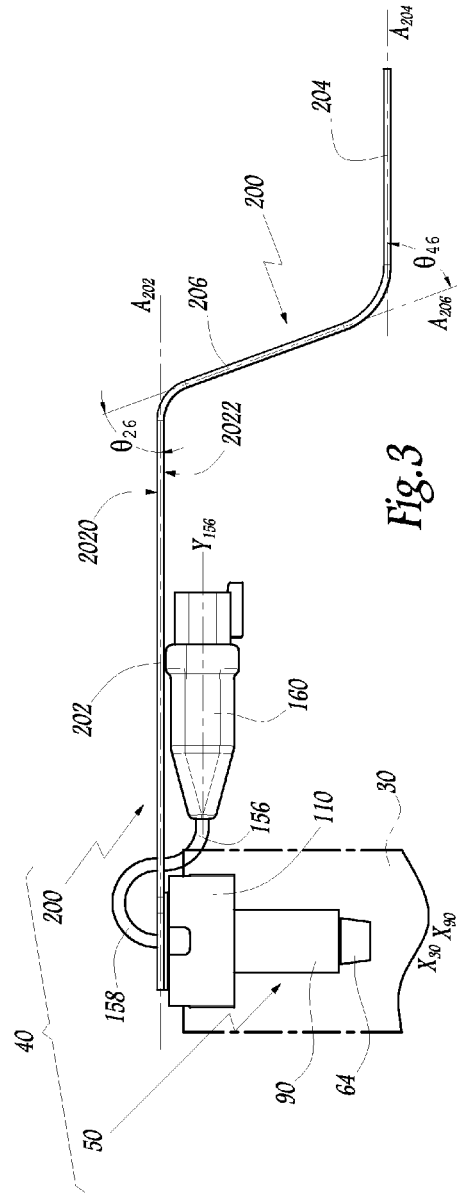

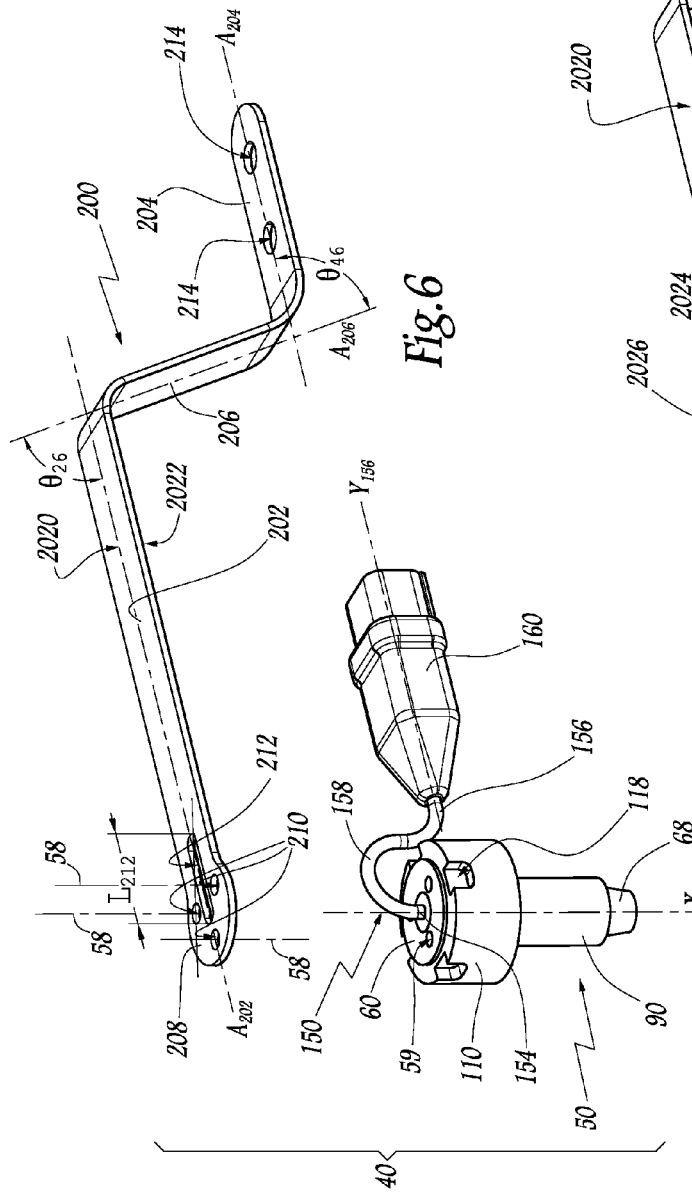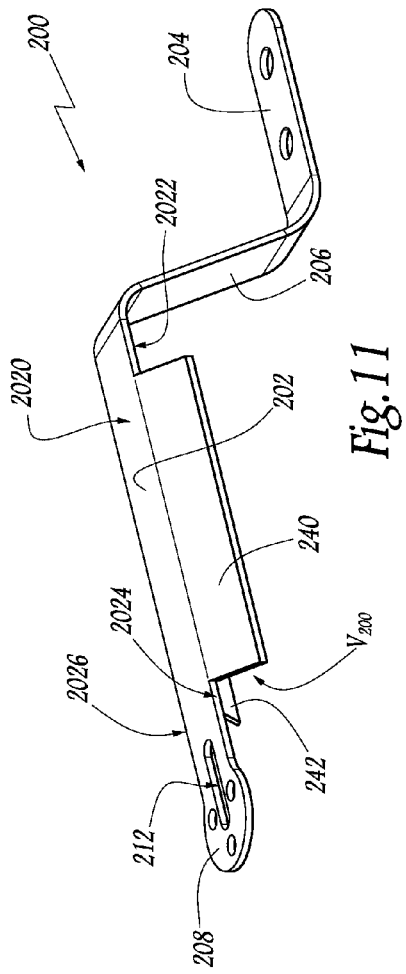

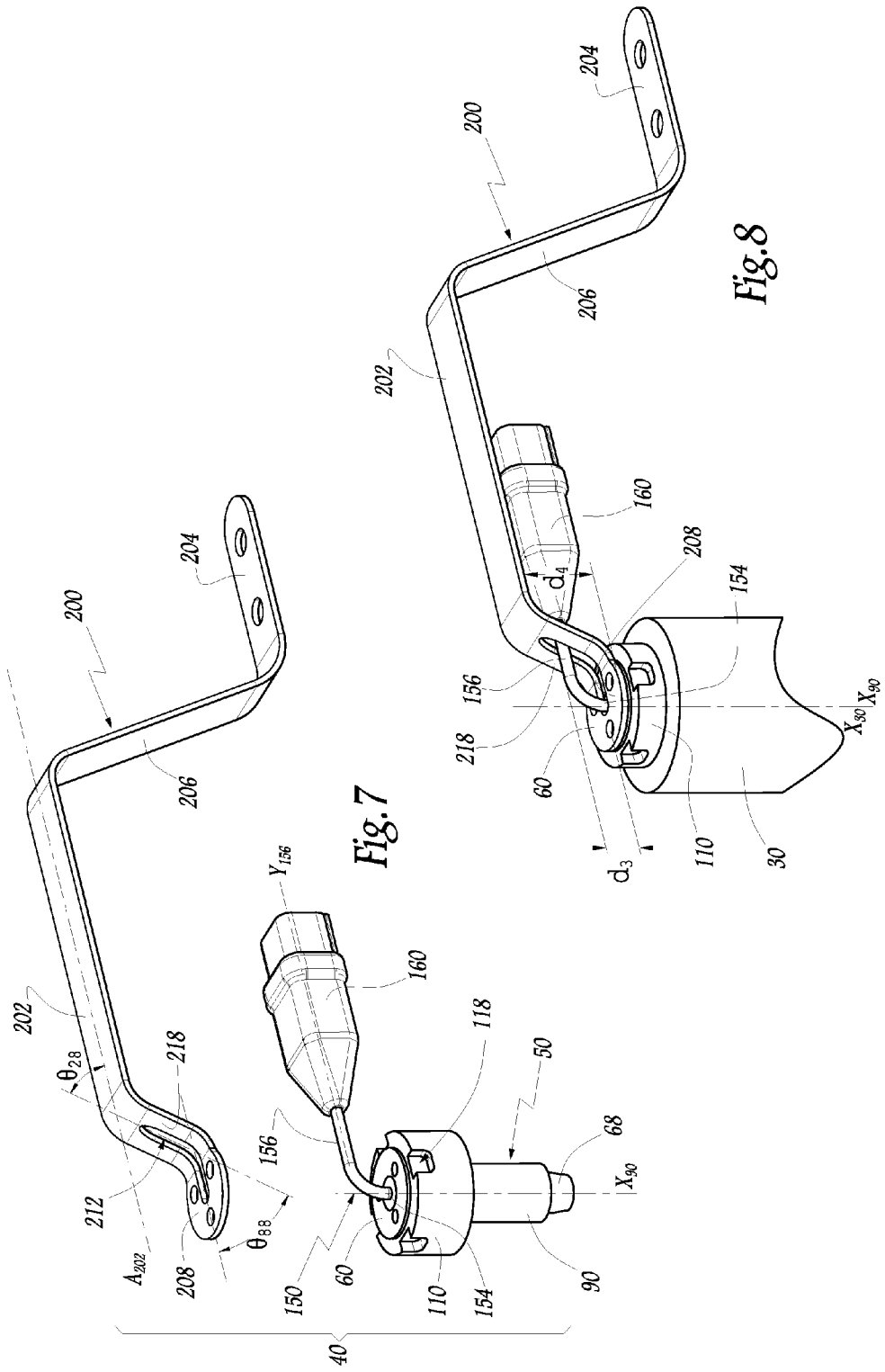

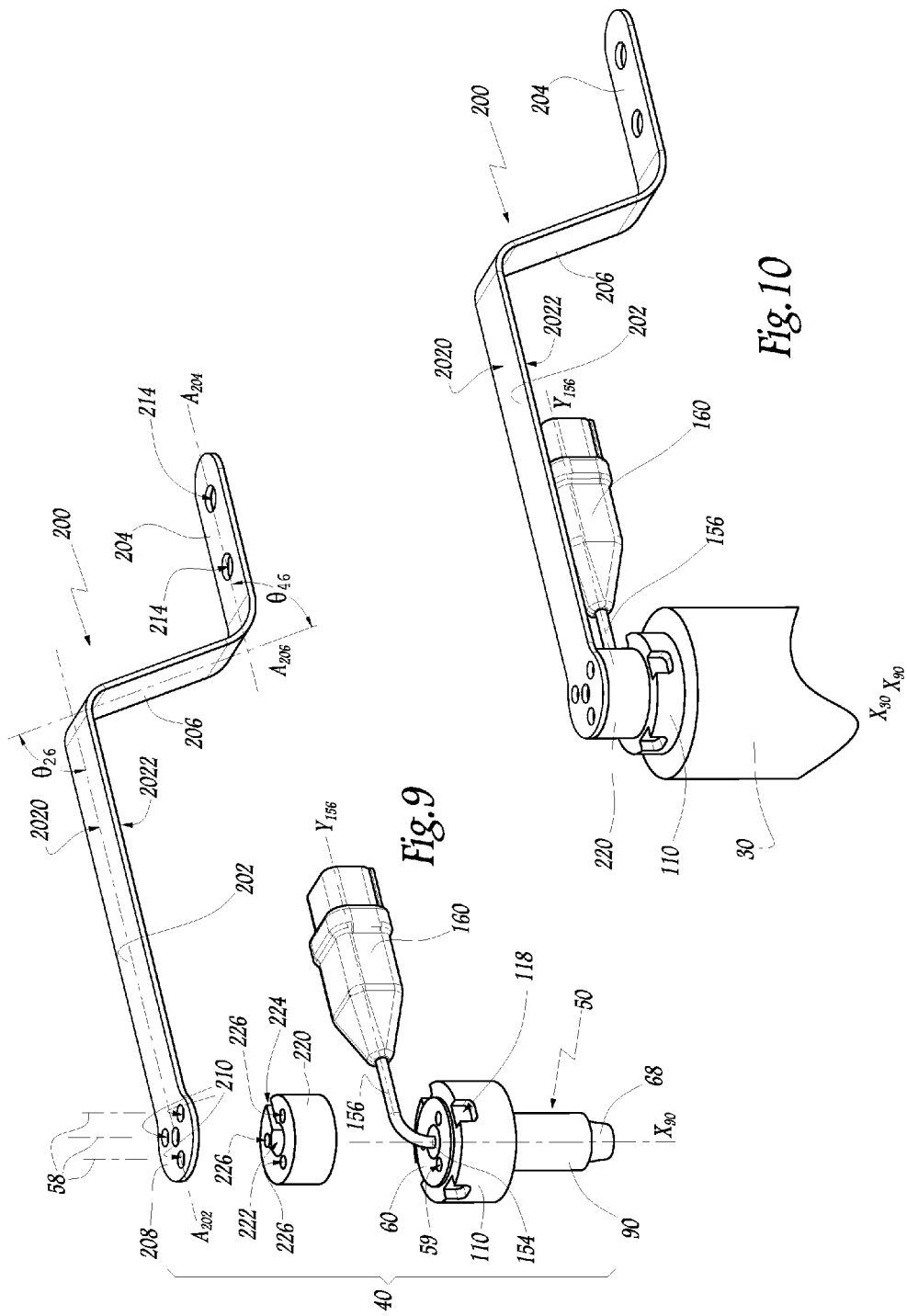

DETECTION SYSTEM, JOINT SYSTEM PROVIDED WITH SUCH A DETECTION SYSTEM AND AUTOMOTIVE VEHICLE EQUIPPED WITH SUCH A JOINT SYSTEM

CROSS-REFERENCE

This application is the US national stage of International Application No. PCT/IB2009/05780 filed on Apr. 6, 2009.

TECHNICAL FIELD OF THE INVENTION

This invention relates to a detection system to be used in a joint between two parts that can pivot one with respect to the other. The invention also relates to an instrumented joint system between a first part and a second part that can pivot one with respect to the other. Finally, the invention relates to an automotive vehicle equipped with such a joint system.

BACKGROUND OF THE INVENTION

Instrumented joint systems are used, for example on the articulated arms of an earth moving machine, in order to control the angular movement of one part with respect to another. Such joint systems may include a pin fixed with respect to one part and mounted with a possibility of rotation with respect to another part of the joint. It is known from FR-A-2 904 671 to incorporate, within such a pin, an assembly for detecting some parameters of the rotation of one of the articulated parts with respect to the other. This detection assembly includes two magnetically cooperating components, one of them being fastened with the pin, wherein the other one is rotating with respect to the pin. A ball bearing is used to allow the rotation of one of these components with respect to the pin. This detection assembly is made of several parts which must be installed one after the other within the housing. This requires high technical skills and is time consuming. Moreover, the diameter of this assembly is quite important with respect to the diameter of the pin, which can generate weak zones in the pin, with a risk of breakage in use of the joint.

The detection assembly is connected to a non-represented control unit via a connector installed within a lateral bore provided on the pin, which induces that the pin must protrude on a relatively long distance from the corresponding housing of one of the articulated parts. The lateral bore weakens the pin and the part of the pin protruding out of its housing is not protected against shocks. Moreover, a cable plugged onto the connector might be easily broken or otherwise damaged by an obstacle in the vicinity of the joint system.

SUMMARY OF THE INVENTION

The invention aims at solving these problems with a new detection system for an articulated joint, the resistance and lifetime of this detection system being improved.

With this respect, the invention concerns a detection system for an articulated joint between a first part and a second part that can pivot one with respect to the other, around a geometrical axis which is a central axis of a pin held in position within a housing formed by the first part, the detection system comprising:
- a detection assembly for detecting a rotation parameter of one of the parts with respect to the other, this detection assembly being adapted to be mounted inside a housing of a pin and comprising at least one rolling bearing, first and second cooperating components and electrical connecting means adapted to connect the detection assembly to a control unit, the electrical connecting means comprising at least one electric cable extending outside the detection assembly and outside the pin, between the detection assembly and the control unit,
- a bracket adapted to connect the detection assembly to the second part when the detection assembly is mounted within the housing of the pin, wherein
- the electric cable has a first portion which extends parallel to the central axis of the pin and outside the detection assembly when the detection assembly is mounted within the housing of the pin, and
- the detection system includes means to arrange a second portion of the electric cable and/or a connector provided at the end of this second portion along a first arm of the bracket, on a first side of this arm oriented towards the detection assembly.

Thanks to the first portion of the electric cable, the electrical connecting means between the detection assembly and the control unit do not have to go through a lateral bore of the pin, which facilitates mounting of the detection assembly on the pin. In particular, the detection assembly can be formed by a pre-mounted unit. The first arm of the bracket protects the second portion of the electric cable, and possibly the connector, from their environment, which avoids damages to this cable and this connector.

A rotation parameter of one part with respect to the other is a parameter which is representative of the pivoting movement of one part with respect to the other. Such a parameter can be an angle measuring the angular position of one part with respect to the other, around the geometrical axis. Such a parameter can also be a speed, a displacement, an acceleration or a vibration.

When an element is said to be mounted onto another element in the sense of this invention, these elements are fixed in rotation with each other, unless otherwise specified.

According to further aspects of the invention, which are advantageous but not compulsory, the detection assembly might incorporate one or several of the following features taken in any technically compatible configuration:
- The bracket is made of one piece and has at least a second arm substantially parallel to the first arm and adapted to be mounted on the second part, a first connecting portion extending between the first and second arms and inclined with respect to each of the first and second arms by an angle between 45° and 90°, preferably between 50° and 70°. In such a case, the bracket advantageously has a third arm, substantially parallel to the first and second arms and adapted to be mounted onto the detection assembly, and a second connecting portion extending between the first and third arms and inclined with respect to each of the first and third arms by an angle between 45° and 90°, preferably between 50° and 70°.
- The electric cable is equipped with a connector which is located along the first arm of the bracket, on its first side.
- Alternatively, the electric cable is equipped with a first connector plugged onto a second connector protruding from the detection assembly and a cable extends from the first connector towards the control unit partly along the first side of the first arm of the bracket.
- The bracket is provided with at least one hole and the electric cable goes through the hole. In such a case, the hole is advantageously oblong and the cable goes through the hole twice. When the bracket has a third arm and a second connecting portion, the oblong hole can extend through this arm and this connecting portion.

The system includes a spacer located, along the central axis of the pin, between the detection assembly and the bracket, this spacer having a central hollow volume for receiving a first portion of the electric cable and at least one lateral opening allowing the passage of the electric cable between the hollow volume and a zone located next to the first side of the first arm of the bracket.

The first arm is provided with at least one skirt which extends along its first side. In such a case, the first arm is advantageously provided with two skirts extending along its first side and defining between them and with the first side of the bracket a volume for receiving the second portion of the electric cable and/or the connector.

The detection assembly includes a support member fast in rotation with the pin, a first ring of the first rolling bearing being mounted on the support member, whereas the support member holds a first one of said components. The detection assembly also includes a body mounted, at a first end, on a second of the first rolling bearing, a second rolling bearing with a first ring mounted on the body, at a second end of the body, and a nut provided with an external thread cooperating with an internal thread of the housing, the nut being adapted to exert, on the second rolling bearing, an axial effort directed towards the first end of the body, this axial effort pressing a surface of the support member against a corresponding surface of the housing.

The invention also concerns an instrumented joint system between a first part and a second part that can pivot, around a central geometrical axis of the joint, one with respect to the other, the joint system including a pin whose central axis is aligned on the central geometrical axis of the joint, this pin being fast with the first part and mounted with respect to the second part with a possibility of rotation, wherein the joint system comprises a detection system as mentioned hereabove.

According to an advantageous aspect of the invention, the first side of the first arm is oriented towards the first part and/or towards the second part.

Finally, the invention concerns an automotive vehicle, in particular a construction vehicle, an agricultural vehicle or a mining vehicle, equipped with an instrumented joint system as mentioned here-above.

BRIEF DESCRIPTION OF THE DRAWINGS

The invention will be better understood on the basis of the following description which is given in correspondence with the annexed figures and as an illustrative example, without restricting the object of the invention. In the annexed figures:

FIG. 2 is a partial perspective view of a pin used in the joint system of FIG. 1 and equipped with a detection system according to the invention;

FIG. 3 is a side view of the detection system mounted on the pin of FIG. 2 which is represented in phantom;

FIG. 6 is a perspective partly exploded view of the detection system according to the invention used in the joint system of FIGS. 1 to 5;

FIG. 7 is a perspective partly exploded view similar to FIG. 6 for a detection system according to a second embodiment of the invention;

FIG. 8 is a perspective view similar to FIG. 2 for the embodiment of FIG. 7;

FIG. 9 is a perspective partly exploded view of a detection system according to a third embodiment of the invention;

FIG. 10 is a view similar to FIG. 2 for the embodiment of FIG. 9;

FIG. 11 is a perspective view of a bracket belonging to a fourth embodiment of the invention;

DETAILED DESCRIPTION OF SOME EMBODIMENTS

Figure 1:
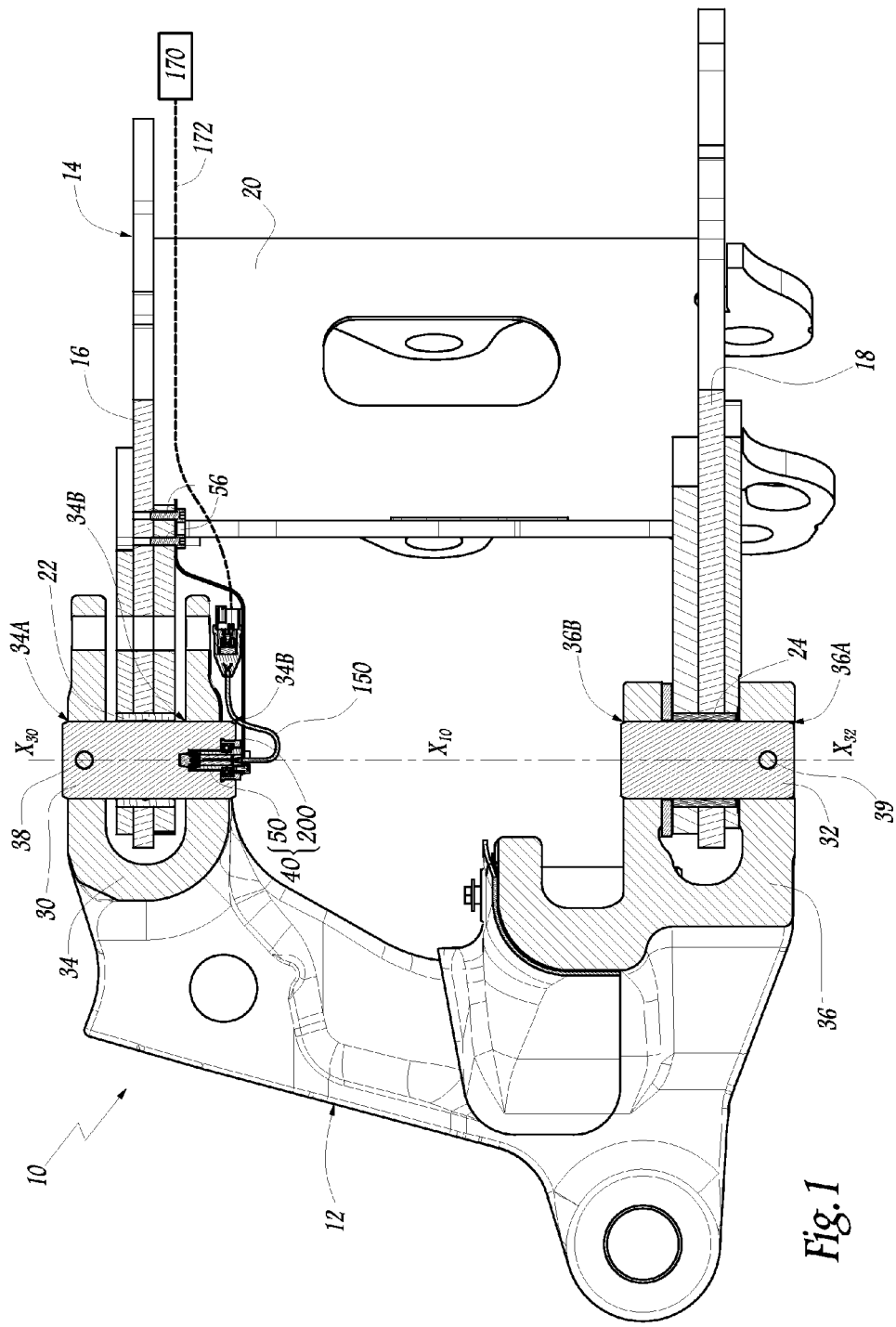
FIG. 1 is a cross-view in axial section of an instrumented joint system according to the invention including a detection system according to the invention.

The instrumented joint system 10 represented on FIG. 1 connects a first part 12 to a second part 14 of an earth moving machine. Part 12 is, for example, an articulated arm of a backhoe loader which is supposed to move with respect to part 14 fixed and secured to a non represented chassis of the loader.

Part 14 includes two beams 16 and 18 connected by a spacer 20. One plain bearing or bushing 22 or 24 is mounted at one extremity of each beam 16 or 18 and dimensioned to receive each a pin 30 or 32 with a possibility of rotation around a common axis $X_{10}$, which is an axis of rotation of parts 12 and 14, one with respect to the other.

Each pin 30 or 32 is cylindrical, with a circular basis. $X_{30}$ and $X_{32}$ respectively denote the central longitudinal axes of pins 30 and 32. In the assembled configuration of joint system 10, axes $X_{30}$ and $X_{32}$ are aligned on axis $X_{10}$.

Part 12 has globally the shape of a U, with both ends of its branches forming a clevis 34 or 36 surrounding the ends of the beams 16 and 18 and plain bearings 22 and 24. Pin 30 is fixedly mounted within two housings 34A and 34B of clevis 34 which are aligned along axis $X_{10}$. Pin 30 is immobilized in rotation around axes $X_{30}$ and $X_{10}$ with respect to part 12 thanks to a locking gudgeon 38. Similarly, pin 32 is held in position with respect to two aligned housings 36A and 36B of clevis 36 thanks to a locking gudgeon 39.

In order to detect the angular displacement of moving part 12 relative to fixed part 14, the joint system 10 also includes a detection system 40 which comprises a detection assembly 50 adapted to detect a rotation angle between parts 12 and 14 and is mounted within one housing 52 drilled in pin 30 and centered on axis $X_{30}$.

A connecting bracket 200 also belongs to detection system 40 and is connected by two bolts 56 to beam 16. This connecting bracket is also connected by three bolts 58 to a socket 60 belonging to assembly 50. Bolts 58 are represented by their respective longitudinal axes on FIGS. 2 to 6.

Assembly 50 includes a support member 64 provided with a taper shank 66 whose external surface 68 is frustroconical and centered on axis $X_{30}$ when assembly 50 is mounted within housing 52. The geometry of taper shank 66 corresponds to the geometry of an end portion 70 of housing 52 whose peripheral surface 72 is also frustroconical. Angle α denotes the semitop angle of surface 68, whereas angle β denotes the semitop angle of surface 72. Angles α and β have the same value, so that support member 64 can be blocked in rotation by adherence around axis $X_{30}$, with respect to pin 30, when surfaces 68 and 72 are being pressed one against the other.

Support member 64 also includes a cylindrical base part 73 provided with a central recess 74 for receiving a magnetized ring 76 which is blocked within recess 74 by cooperation of shapes. Magnetized ring is actually made of a magnet.

Assembly 50 also includes a first ball bearing 80 whose internal and external rings are respectively denoted 82 and 84. 86 denotes the balls of bearing 80.

In this description, the expression "rolling bearing" is meant to cover any type of bearing having rolling parts, e.g. balls, needles or rollers. A ball bearing is an example of a rolling bearing.

Internal ring 82 of ball bearing 80 is fixedly mounted on cylindrical base part 73.

Assembly 50 also includes a tubular body 90 in a form of a sleeve, with a first end 91 surrounding ball bearing 80. Actually, external ring 84 is fixedly mounted within first end 91. 92 denotes the second end of body 90, that is the end opposite to first end 91.

Assembly 50 also includes a second ball bearing 100 whose internal and external rings are respectively denoted 102 and 104, whereas its balls are denoted 106. Ring 102 is fixedly mounted on end 92 of body 90. Ring 102 is also fixedly mounted on socket 60, so that items 60 and 90 are fast in rotation with each other, through ring 102.

A nut 110 is located around bearing 100 and provided with an external thread 112 adapted to cooperate with an internal thread 114 of housing 52. Nut 110 is provided with a flange 116 extending radially towards axis $X_{30}$. Ring 104 is fixedly mounted within nut 110. The mutual locking of the nut 110 and the housing 52 by means of mutually engaging threads makes it possible to easily remove the nut, for instance in case of maintenance or inspection. However, and alternatively, the nut could be locked into the housing by other means such as gluing or force-fitting.

An elastically deformable washer 120 is located axially between flange 116 and ball bearing 100.

Figure 4:
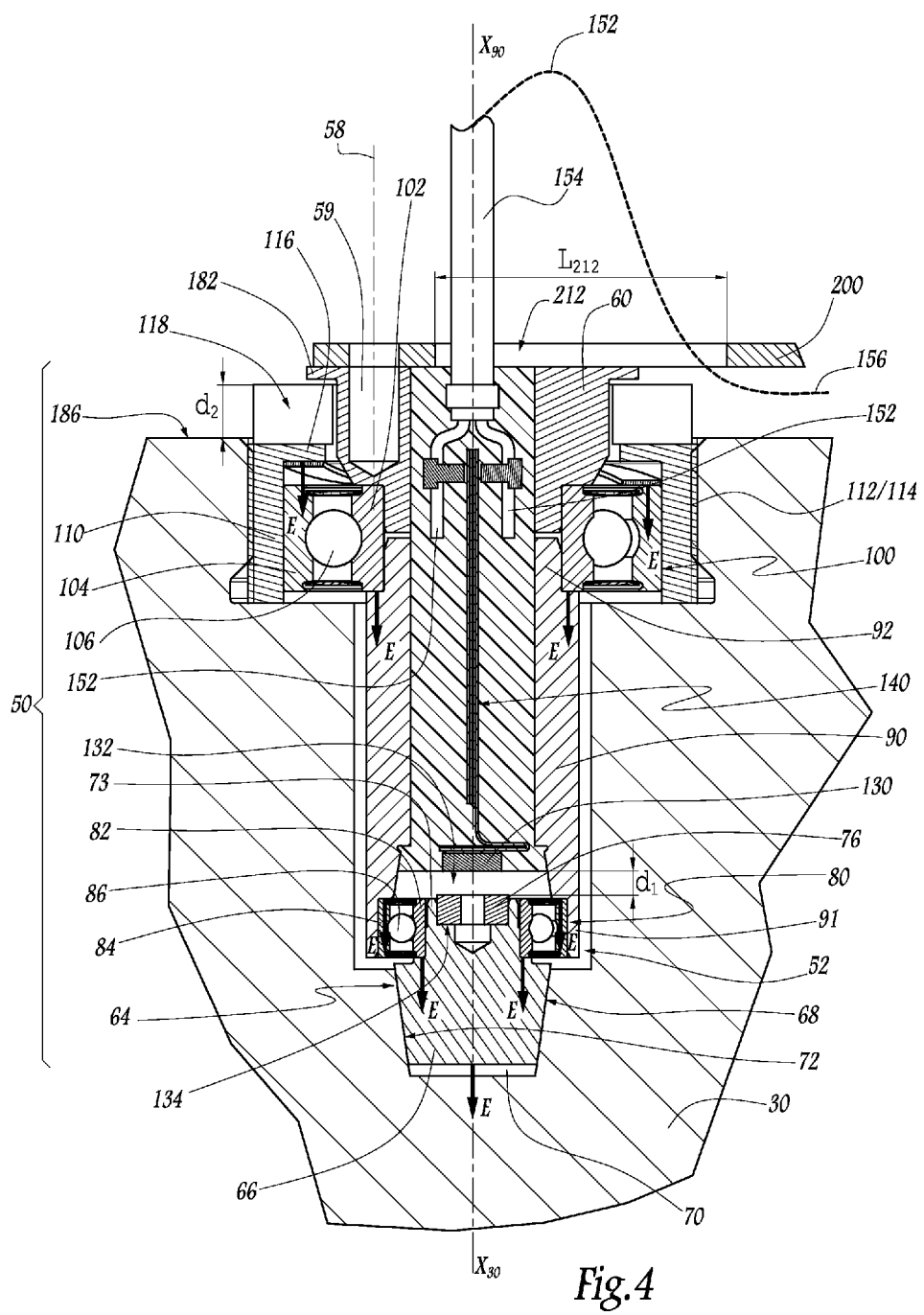
FIG. 4 is a partial cut view along plane IV on FIG. 2.

As shown on FIG. 4, an axial effort E, that is an effort parallel to axis $X_{30}$, can be exerted by flange 116 on washer 120, this effort E being transmitted to ball bearing 100 by washer 120. Effort E is then transmitted to body through bearing 100 and, from body 90 to support member 64 via ball bearing 80. Therefore, effort E, which is exerted by nut 110 on ball bearing 100 via washer 120, firmly presses surface 68 against surface 72, thus ensuring an immobilization in rotation of member 64 with respect to pin 30, thanks to the cooperation of shapes and adherence between surfaces 68 and 72.

A magnetic sensor 130, e.g. in the form of a hall effect cell, is installed in the interior volume 132 of tubular body 90, at an axial distance $d_1$ of magnetized ring 76 sufficiently small to allow sensor 30 to detect a rotation of ring 76 with respect to body 90.

Elements 64 and 76 are fixed in rotation with respect to pin 30, thanks to effort E. Elements 90 and 60 can rotate with respect to pin 30 when part 14 moves with respect to part 12, thus driving connecting rod 54 and socket 60 in rotation around axis $X_{30}$.

Sensor 130 is mounted on a printed circuit board 140 (PCB). On the figures, the electronic components of the circuit supported by printed circuit board 140 are not represented, but for sensor 130. Rotation detection components 76 and 130 cooperate magnetically. According to alternative embodiments of the invention, the rotation detection means can cooperate in an inductive way or optically.

$X_{90}$ denotes the central longitudinal axis of body 90. This axis is aligned with axis $X_{30}$ when assembly 50 is mounted within housing 52.

Close to its end opposite sensor 130, PCB 140 is provided with connectors 142 adapted to receive the respective ends of electric conductors 152 which belong to a flexible cable 150 connected to a plug 160 by which assembly 50 can be connected to an electronic control unit (ECU) 170 via an electric line 172, as shown on FIG. 1. The fact that cable 150 is flexible and that socket 60 is located outside housing 52 facilitates connection of assembly 50 to ECU 170.

In order to protect PCB 140 from pollution and/or contact with external elements, a potting 180 of insulating synthetic resin is molded within the internal volumes of tubular body 90 and socket 60. This potting 180 also permits to hold PCB 140 in position within these volumes.

Once a sub-assembly made of items 60, 90, 100, 110, 130, 140, 150, 160 and 180 has been realized, it is possible to mount within end 91 of tubular body 90 items 64 and 80, in order to reach a configuration where assembly 50 constitutes a unitary item which can be easily manipulated in order to be installed within housing 52, without specific skills and in a relatively short time.

With this respect, socket 60 is provided with an external flange 182 which protrudes radially in such a way that it prevents nut 110 from falling out of assembly 50.

Figure 5:
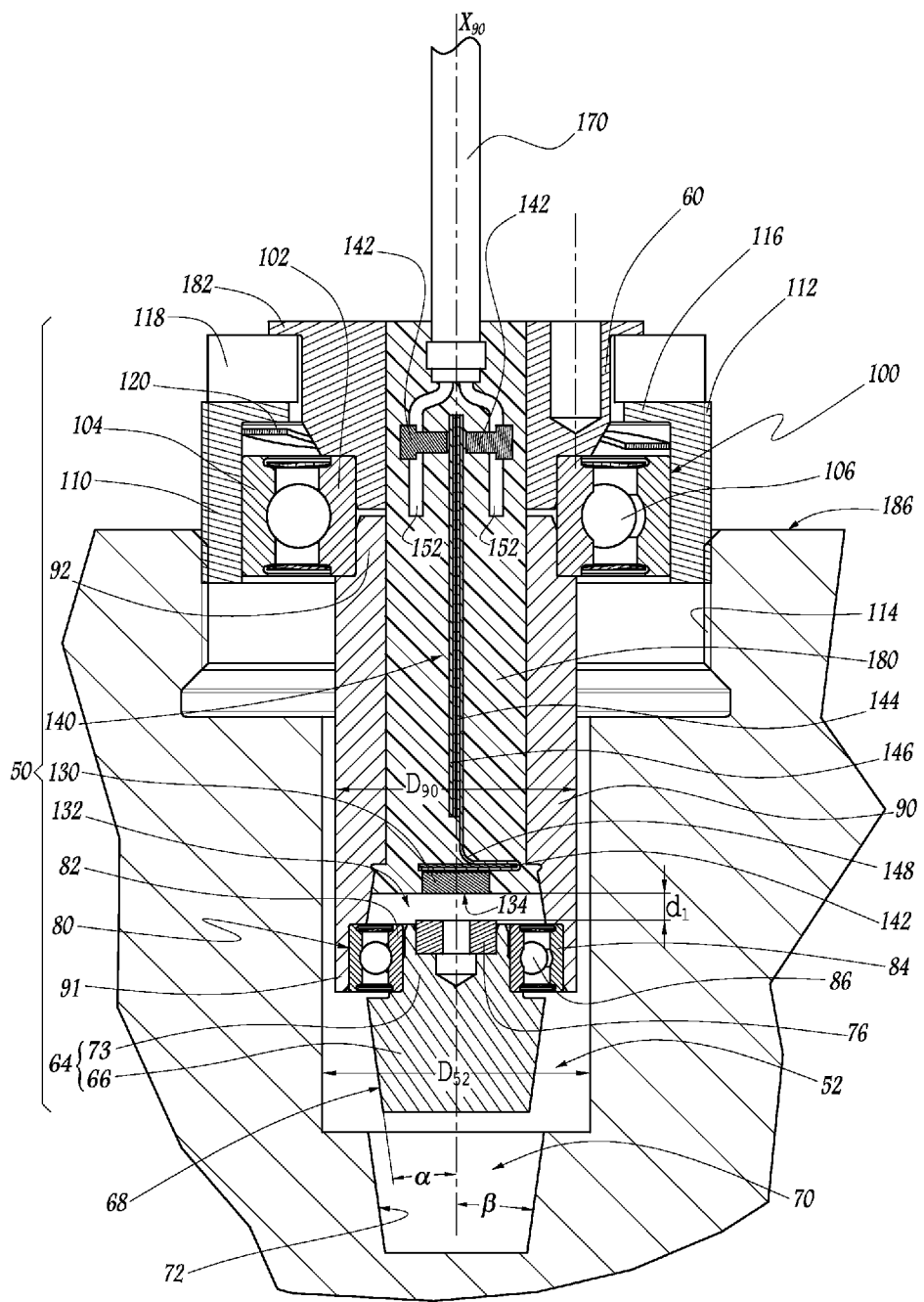
FIG. 5 is a view similar to FIG. 4 when the detection system is being mounted on the pin.

Once assembly 50 has been constituted as explained hereabove, it can be introduced within housing 52, as shown on FIG. 5. Screwing of nut 110 pushes assembly 50 towards the configuration of FIG. 4 where effort E firmly immobilizes support member 64 with respect to pin 30, by the cooperation between surfaces 68 and 72.

In order to facilitate its driving in rotation around axes $X_{90}$ and $X_{30}$, nut 110 is provided with four notches 118 adapted to receive a tool, such as the end of the stem of a screwdriver. In the working configuration of assembly 50 represented on FIG. 4, nut 110 protrudes from the end surface 186 of pin 30 on a distance $d_2$, so that the notches 118 can be easily accessed. Therefore, no specific tool is to be used for screwing or unscrewing nut 110 in housing 52.

The use of an elastically deformable washer to transmit effort E between nut 110 and ball bearing 100 allows to compensate for the possible variations of dimensions between the constitutive parts of assembly 50. In other words, washer 120 can accommodate differences in the dimensions of items 64, 80, 90, 100, 110 and 60.

The invention is represented on the annexed figures with a washer having undulations. A Belleville washer, or any kind of elastically deformable washer, can also be used.

The portion 154 of cable 150 which is surrounded by potting 180 is held in a position where it extends along axis $X_{90}$, that is along axis $X_{30}$ when assembly 50 is mounted within housing 52. This portion extends through socket 60 up to outside the socket where it protrudes along axes $X_{30}$ and $X_{90}$. Thanks to this configuration of detection assembly 50 and cable 150, it is not necessary to drill a lateral hole within pin 30 as in FR-A-2 904 67, which improves the mechanical characteristics of pin 30. Moreover, distance $d_2$ can be kept low.

In order to avoid that cable 150 be damaged by external obstacles or rocks moving around joint 10, means are provided so that a portion 156 of cable 150 and plug 160 are "covered" by bracket 200.

As shown in particular on FIGS. 2, 3 and 6, bracket 200 comprises a first rectilinear arm 202 which extends along a first longitudinal axis $A_{202}$ and a second rectilinear arm 204 which extends along a second longitudinal axis $A_{204}$ parallel to axis $A_{202}$. A connecting portion 206 connects arms 202 and 204 and extends along a longitudinal axis $A_{206}$ which makes an acute angle $\theta_{26}$ with axis $A_{202}$ and another acute angle $\theta_{46}$ with axis $A_{204}$. Since axes $A_{202}$ and $A_{204}$ are parallel, angles $\theta_{26}$ and $\theta_{46}$ have the same value. In practice, the value of angles $\theta_{26}$ and $\theta_{46}$ is between 45° and 90°, preferably between 50° and 70°.

Opposite to connecting portion 206, first arm 202 is provided with a connecting head 208 provided with three cylindrical holes 210 adapted to receive the stems of screws 58 when they are inserted in corresponding threaded holes 59 of socket 50.

Arm 204 is provided with two holes 214 adapted to receive the stems of bolts 56 when they are threaded on beam 16.

Bracket 200 is also provided with an oblong hole 212 whose length $L_{212}$ extends along axis $A_{202}$ so that flexible cable 150 can make a loop 158 on about 180° above the upper side 2020 of arm 202 on FIG. 3, that is on the side of arm 202 which is opposite to pin 30 and detection assembly 50. This allows the second portion 156 of cable 150, which ends with plug 160, to be located along arm 202 on its side 2022 which is oriented towards items 30 and 50, that is towards parts 12 and 14 when detection system 50 is mounted on pin 30 belonging to joint system 10.

In practice, length $L_{212}$ has a value between 10 mm and 60 mm, preferably between 20 mm and 40 mm for a pin having a diameter $D_{30}$ between 40 mm to 200 mm, preferably between 45 mm and 75 mm, and in a preferred embodiment of about 50 mm. The ratio $L_{212}/D_{30}$ can be between 0,1 and 1, depending on the stiffness of cable 150.

Thanks to hole 212, only a small part of cable 150, namely loop 158, protrudes away from pin 30 with respect to arm 202, in a direction parallel to axis $X_{10}$, whereas the second portion 156 of cable 150 and the plug 160 are protected from interference with outside elements by the first arm 202 of bracket 200. Portion 156 extends along an axis $Y_{156}$ which is radial with respect to axes $X_{10}$, $X_{30}$ and $X_{90}$ when detection assembly 50 is mounted on pin 30 and pin 30 is mounted within joint system 10.

In the second to fourth embodiments of the invention represented on FIGS. 7 to 11, the same elements as in the first embodiment have the same references. Hereafter, only the differences between these embodiments and the first embodiment are mentioned.

In the embodiment of FIGS. 7 and 8, the connecting head 208 forms a third arm which extends, on a limited length, along an axis $A_{208}$ parallel to the longitudinal axis $A_{202}$ of the first arm 202 of bracket 200.

A second connecting portion 218 extends between first and third arms 202 and 208. An oblong hole 212 extends in first arm 208 and second connecting portion 218, so that flexible cable 150 can be bent at an angle of about 90° in a configuration where a first portion 154 of this cable extends along axes $X_{90}$ and $X_{30}$ when detection assembly 50 is mounted within pin 30, and a second portion 156 extends along an axis $Y_{156}$ which is radial with respect to axis $X_{90}$. The end part of portion 156 and a plug 160 connected on this end part are arranged along first arm 202, on its side 2022 oriented towards assembly 50, pin 30 and parts 12 and 14 when the joint system 10 is in working configuration.

Connecting portion 218 extends along an axis $A_{218}$ which makes with axes $A_{202}$ and $A_{208}$ respectively an angle $\theta_{28}$ and $\theta_{88}$ which can have values between 45° and 90°, preferably between 50° and 70°.

This embodiment is more protective for the cable 150 than the first one insofar as the loop 158, which is accessible from the side of the bracket 200 opposite to the detection assembly 50, projects with respect to the third arm 208 on a distance $d_3$ taken along axis $X_{30}$ which is smaller than the distance $d_4$ taken along this axis between arms 202 and 208, so that arm 208 partly prevents access to loop 158 from the right side of FIG. 8. Moreover, cable 150 is bended on 90° only between parts 154 and 156.

In the embodiment of FIGS. 9 and 10, bracket 200 has substantially the same shape as in the first embodiment but is not provided with an oblong hole similar to hole 212. Bracket 200 has two arms 202 and 204 and a connecting portion 206 which respectively extends along longitudinal axes $A_{202}$, $A_{204}$ and $A_{206}$ similar to the ones of the first embodiment. Angles $\theta_{26}$ and $\theta_{46}$ can be defined as in the first embodiment, with the same values.

A spacer 220 is mounted on socket 60 and is provided with a central hollow volume 222 for receiving the first portion 154 of cable 150 coming out of socket 60, along axes $X_{90}$ and $X_{30}$. Spacer 220 is also provided with a lateral slit 224 which connects hollow volume 222 to the outside of spacer 220, along a radial direction.

Spacer 220 is provided with three holes 226 adapted to be aligned with the threaded holes 59 of socket 60 so that the stems of screws 58 can be introduced simultaneously within holes 210 of bracket 200 within holes 226 of spacer 220 and within these threaded holes 59 in order to make a rigid assembly between parts 60, 200 and 220 in a configuration where cable 150 has a first portion 154 which extends along axis $X_{90}$ and a second portion 156 which extends along arm 202, on its side 2022 oriented towards unit 50 in the working configuration of detection system 40.

According to a non-represented embodiment of the invention, spacer 220 can be integral with socket 60. In such a case, holes 226 are threaded holes adapted to receive screws 58.

In the fourth embodiment of the invention represented on FIG. 11, a bracket 200 is supposed to be used as the bracket of the first embodiment. This bracket is provided with two skirts 240 and 242 which extend along the lateral edges 2024 and 2026 of first arm 202 next to its side 2022, so that they define between them and with side 2022 a volume $V_{200}$ where a second portion of an electric cable similar to portion 156 of the first embodiment and a plug similar to plug 160 can be received and protected from interference with outside elements.

In the embodiment of FIG. 11, the volume $V_{200}$ has an inverted truncated V portion. The skirts 240 and 242 could be also curved.

Depending on the working conditions of the detection system to which bracket 200 belongs, a skirt can be provided along one edge or along the two edges of the first arm 202. A bracket with one or two such lateral skirts can be used with all embodiments of the invention.

In the first, third and fourth embodiments, the bracket 200 can be said to have a globally flattened S or V shape, whereas in the second embodiment it has a globally flattened double S or double Z shape.

In all embodiments, the arms 202 and 204, and possibly 208, and the connecting portions 208 and 218 are flat. Actually, the bracket 200 is mad of a single strip of steel which gives it a good mechanical resistance in rotation around axis $X_{30}$ with some flexibility in the other directions.

In the second to fourth embodiments, the detecting assembly 50 is the same or substantially the same as in the first embodiment.

Figure 12:
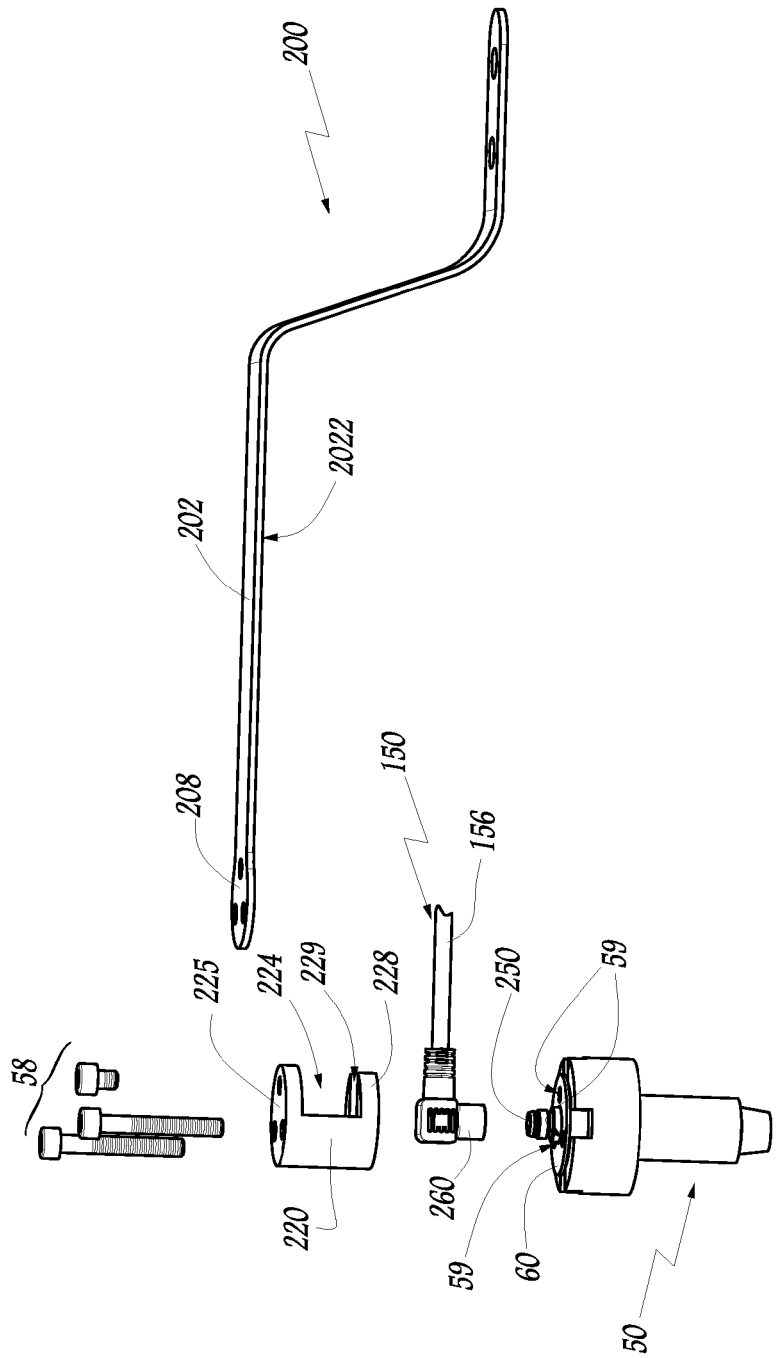
FIG. 12 is an exploded perspective view of a detection system according to a fifth embodiment of the invention.
Figure 13:
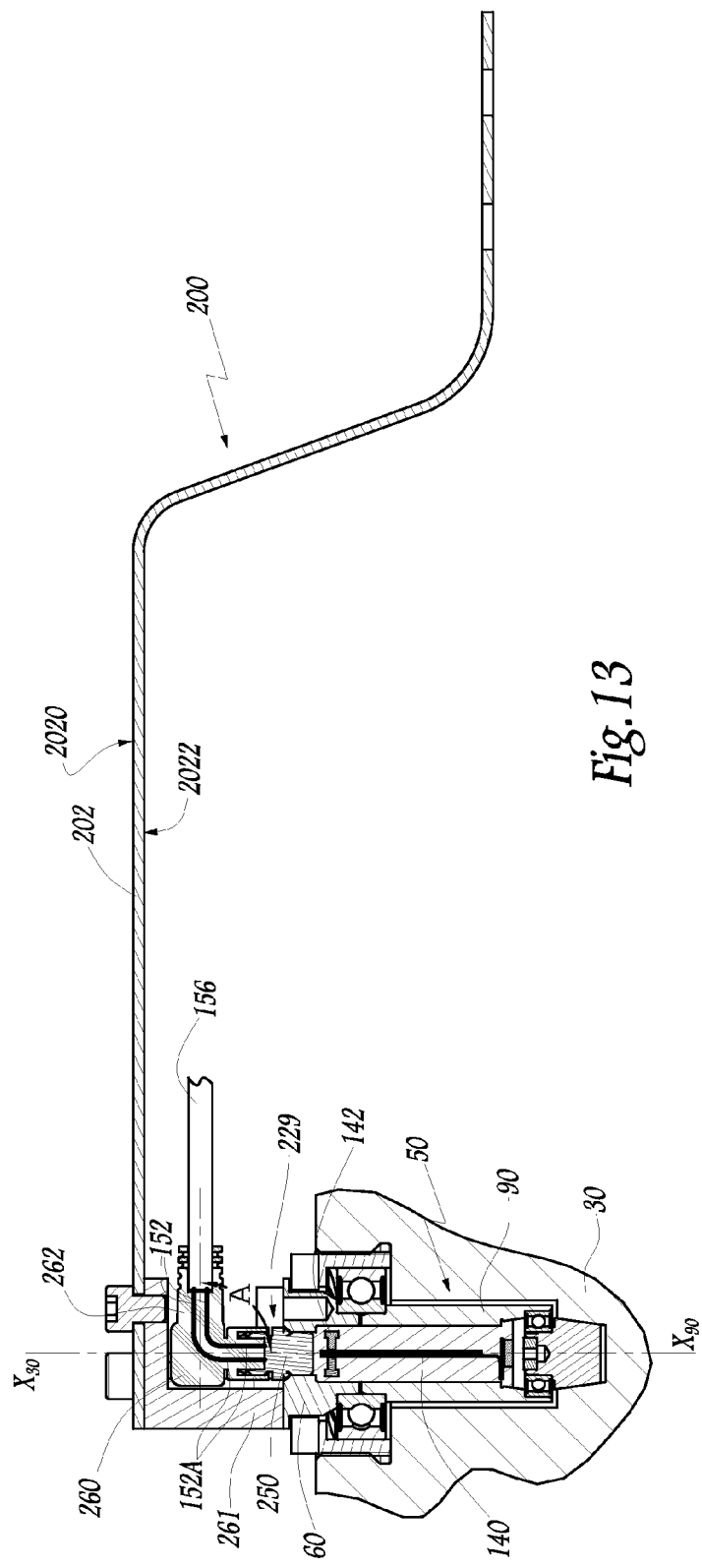
FIG. 13 is a partial cut view of the system of FIG. 12 installed on a pin.

In the embodiment of FIGS. 12 and 13, a first connector 250 is provided in the central part of the socket 60 of the detection assembly 50. This connector is adapted to cooperate with a second connector or plug 260 mounted at an end of the cable 150. Plug 260 makes an angle A of 90° between the respective longitudinal axes of its first part 261 which is supposed to be partly inserted within connector 250 and its second part 262 which receives the end of the sheath of cable 150. As shown on FIG. 13, two conductors 152 of cable 150 extend within plug 260 and have their ends 152A parallel to axis $X_{90}$, that is to the central axis $X_{30}$ of the pin 30 when the detection assembly 50 is mounted on the pin, as shown on FIG. 13.

The connecting parts of connector 250 are not represented on FIG. 13, for the sake of clarity.

Thanks to the geometry of plug 260, the portion 156 of cable 150 which extends outside plug 260 is arranged radially with respect to axes $X_{30}$ and $X_{90}$.

A spacer 220 is provided in order to support a bracket 200 with respect to detection assembly 50. This spacer has a generally cylindrical shape, with a lateral opening 224 adapted for the passage of plug 260. Moreover, spacer 220 has a sole 228 provided with a slit 229 which is adapted to receive the part of connector 250 which protrudes out of socket 60.

Spacer 220 has an upper wall 225 where a connecting portion 208 of bracket 200 can be immobilized by three screws 58, two of these screws passing through spacer 220 on its whole length in order to be tightened into corresponding threaded holes 59 of socket 60. Therefore, as represented on FIG. 13, the second portion 156 of cable 150 extends along a first arm 202 of bracket 200 on the side 2022 of this arm which is oriented towards the detection assembly 50. Here again, portion 156 of the cable 150 is protected from its environment by bracket 200.

Bracket 200 of this embodiment is identical to bracket 200 of the embodiment of FIGS. 9 and 10.

The non represented end of cable 150 is connected to a control unit similar to the control unit 170 represented on FIG. 1.

It should be noted that a connector similar to connector 250 and a corresponding plug can also be used in the embodiments of FIGS. 1 to 8, the corresponding plug having then a configuration such that the part of the cable which extends outside this plug extends parallely to the central axis $X_{30}$ of the pin 30 and is bent to go through a hole similar to the hole 212 of the first, second and fourth embodiments.

The overall structure of assembly 50 is such that the diameter of the part which deeply penetrates into pin 30 is relatively small, since it corresponds to the external diameter $D_{90}$ of body 90. This diameter can be substantially smaller than the diameter of the parts used in the system of FR 2 904 671. Therefore, the internal diameter $D_{52}$ of housing in the major part of its depth overall can be small, thus avoiding risks of breakage of pin 30.

The invention is represented on the figures with ball bearings 80 and 100. However, plain bearings, roller bearings or needle bearings could also be used. Rolling bearings are however preferred in order to keep the friction low.

The invention can be used with any instrumented joint provided with a pin, in particular in off-highway vehicles such as construction vehicles, e.g. backhoe loaders, excavators or wheel loaders, with agricultural vehicles, e.g. tractors and with mining vehicles, e.g. wheel loaders. The invention allows to determine the position of one arm with respect to another arm or to a chassis of such a vehicle. The invention can also be used for the measurement of the angular position of a wheel such as a wheel of a truck or even a car.

The invention claimed is:

1. A detection system for an articulated joint disposed between a first part and a second part that can pivot at least one of the first part with respect to the second part and the second part with respect to the first part, around a geometrical axis which is a central axis of a pin held in position within a housing formed by the first part the detection system comprising:
    a detection assembly for detecting a rotation parameter of at least one of the parts with respect to the other, and wherein
    the detection assembly adapted to be mounted inside a housing of the pin and comprising:
    at least one rolling bearing,
    first and second cooperating components, and
    electrical connecting means adapted to connect the detection assembly to a control unit, and wherein
    the electrical connecting means comprising:
    at least one electric cable extending outside the detection assembly and outside the pin, between the detection assembly and the control unit,
    a bracket adapted to connect the detection assembly to the second part when the detection assembly is mounted within the housing of the pin, and wherein
    the electric cable has a first portion which extends parallel to the central axis of the pin and outside the detection assembly when the detection assembly is mounted within the housing of the pin, and
    the detection system includes means to arrange a second portion of the electric cable and a connector provided at the end of this second portion along a first arm of the bracket, on a first side of the arm oriented towards the detection assembly.

2. The detection system according to claim 1, wherein the bracket is formed from a single component and has:
    at least a second arm substantially parallel to the first arm and adapted to be mounted on the second part, and
    a first connecting portion extending between the first and second arms and inclined with respect to each of the first and second arms by an angle ($\theta_{26}$, $\theta_{46}$), and wherein the angle is between 45° and 90°, and preferably between 50° and 70°.

3. The detection system according to claim 2, wherein the bracket has:
    a third arm, substantially parallel to the first and second arms and adapted to be mounted onto the detection assembly, and
    a second connecting portion extending between the first and third arms and inclined with respect to each of the first and third arms by an angle ($\theta_{28}$, $\theta_{88}$) between 45° and 90°, preferably between 50° and 70°.

4. The detection system according to claim 1, wherein the electric cable is equipped with a connector which is located along the first arm of the bracket, on its first side.

5. The detection system according to claim 1, wherein the electric cable is equipped with a first connector plugged onto a second connector protruding from the detection assembly and the cable extends from the first connector towards the control unit, partly along the first side of the first arm of the bracket.

6. The detection system according to claim 5, wherein the hole is oblong and the cable passes through the hole two times.

7. The detection system according to claim 6, wherein the oblong hole extends through the third arm and the second connecting portion.

8. The detection system according to claim 1, wherein the bracket is provided with at least one hole and the electric cable goes through the hole.

9. The detection system according to claim 1, further comprising a spacer located, along the central axis ($X_{30}$) of the pin, between the detection assembly and the bracket, and wherein
- the spacer having a central hollow volume for receiving the first portion of the electric cable and
- at least one lateral opening allowing the passage of the electric cable between the hollow volume and
- a zone located next to the first side of the first arm of the bracket.

10. The detection system according to claim 1, wherein the first arm is provided with at least one skirt which extends next to its first side.

11. The detection system according to claim 10, wherein the first arm is provided with two skirts extending next to its first side, and wherein
- a volume for receiving at least one of the second portion of the electric cable and the connector is defined by the two skirts and first side.

12. The detection system according to claim 1, wherein the detection assembly includes:
- a support member rotatably coupled to the pin, a first ring of the rolling bearing being mounted on the support member, and wherein
- the support member holds a first one of said first and second cooperating components,
- a body mounted, at a first end, on a second ring of the rolling bearing,
- a second rolling bearing with a first ring mounted on the body, at a second end of the body, and
- a nut provided with an external thread cooperating with an internal thread of the housing, the nut being adapted to exert, on the second rolling bearing, an axial effort directed towards the first end of the body, and wherein
- the axial effort presses a surface of the support member against a corresponding surface of the housing.

13. An instrumented joint system disposed between a first part and a second part that can pivot around a central geometrical axis ($X_{10}$) of the joint, one with respect to the other, and wherein
- the joint system includes a pin whose central axis is aligned on the central geometrical axis of the joint, and wherein
- the pin being fastened with the first part and mounted with respect to the second part with an ability to rotate, and wherein
- the joint system comprises the detection system according to claim 1.

14. The instrumented joint system according to claim 13, wherein the first side of the first arm is oriented towards at least one of the first part and the second part.

* * * * *